United States Patent [19]

Sugiura et al.

[11] 4,213,690

[45] Jul. 22, 1980

[54] COPYING APPARATUS HAVING A HIGH-SPEED COPYING OPTICAL SYSTEM

[75] Inventors: Muneharu Sugiura, Tokyo; Setsuo Minami, Kawasaki; Koichi Miyamoto, Tokyo, all of Japan

[73] Assignee: Canon Kabushiki Kaisha, Tokyo, Japan

[21] Appl. No.: 32,642

[22] Filed: Apr. 23, 1979

[30] Foreign Application Priority Data

Apr. 28, 1978 [JP] Japan .................................. 53-51855

[51] Int. Cl.² ...................... G03B 27/48; G03B 27/50; G03B 27/70
[52] U.S. Cl. .......................................... 355/8; 355/51; 355/52; 355/66
[58] Field of Search .................... 355/52, 8, 51, 65, 66

[56] References Cited

U.S. PATENT DOCUMENTS

| | | | |
|---|---|---|---|
| 3,537,373 | 11/1970 | Land | 354/187 X |
| 4,101,218 | 7/1978 | Saruwatari et al. | 355/8 |
| 4,139,298 | 2/1979 | Tani | 355/8 |
| 4,158,497 | 6/1979 | Suzuki et al. | 355/8 |

*Primary Examiner*—Richard A. Wintercorn
*Attorney, Agent, or Firm*—Fitzpatrick, Cella, Harper & Scinto

[57] ABSTRACT

A copying apparatus having an optical system comprising a fixed original carriage, a rotatable mirror for scanning the original carriage and an image forming optical system for imaging a light flux from the rotatable mirror on a photosensitive medium, said image forming optical system being provided with a swing and tilting lens system having a swing and tilting function and a light path length correcting lens system including at least two movable lens groups movable along the direction of the optic axis and having the function of correcting the length of the light path while maintaining a predetermined image forming magnification, said swing and tilting lens system and said movable lens groups being moved in synchronism with said rotatable mirror to thereby form the image of the original on the photosensitive medium without swing and tilting.

12 Claims, 22 Drawing Figures

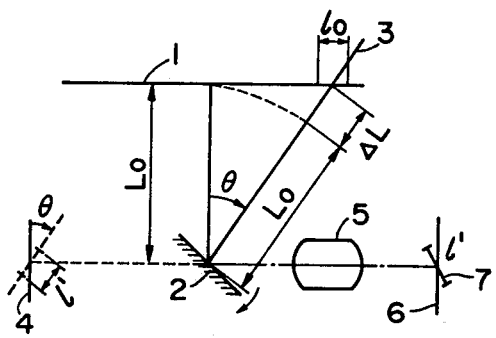
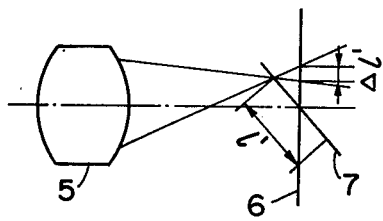
FIG. 1 PRIOR ART
FIG. 2
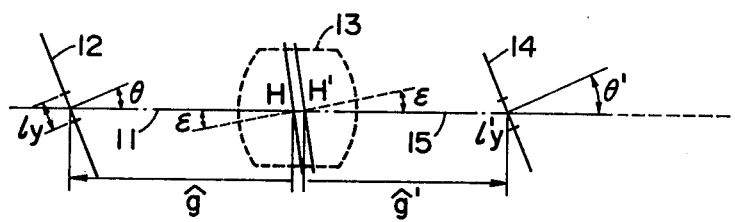
FIG. 3
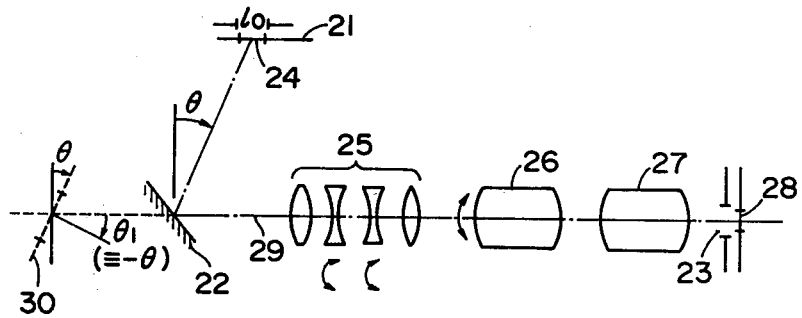
FIG. 4
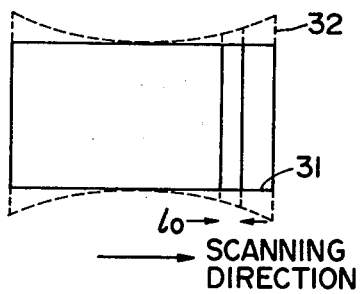
$\beta_{Ty}=\beta_T$
FIG. 5(A)
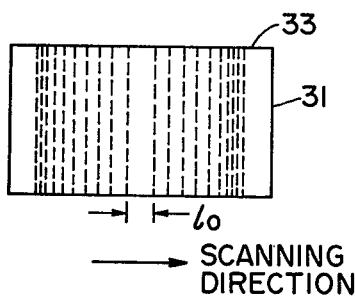
$\beta_{Tz}=\beta_T$
FIG. 5(B)

COPYING APPARATUS HAVING A HIGH-SPEED COPYING OPTICAL SYSTEM

BACKGROUND OF THE INVENTION

1. Field of the Invention

This invention relates to a copying apparatus of the slit exposure type in which a flat stationary original is scanned by a rotatable scanning mirror to thereby exposure a photosensitive medium to the image of the original at high speed and without swing and tilting of the image.

2. Description of the Prior Art

It is well-known that the exposure scanning system using a rotatable scanning mirror is highly effective in terms of vibration and mechanism to realize high-speed copying. FIG. 1 of the accompanying drawings in a schematic view showing an example of the conventional exposure scanning system using a rotatable scanning mirror. A flat original 1 is scanned as a slit portion original 3 having a width lo by a rotatable mirror 2 and this slit portion original 3 is imaged on a projection image plane (a photosensitive medium surface) 6 by a projection optical system 5. However, when a flat original is scanned by the use of the rotatable mirror 2, there is a difficult problem that the length of the light path between the original surface 1 and the photosensitive medium surface 6 is varied with the rotation of the rotatable scanning mirror 2. That is, if the position of the rotatable scanning mirror when the distance between the rotatable scanning mirror 2 and the original surface is shortest (Lo) is the standard position and the distance between the scanning mirror 2 and the original surface 1 when the scanning mirror has been rotated by $\theta$ from the standard position is Lo+$\Delta$L, the following expression can be indicated:

$$\Delta L = \left(\frac{1}{\cos\theta} - 1\right)Lo,$$

where $\Delta$L is the amount of deviation of the length of the light path caused by the rotation of the scanning mirror 2. In the usually thinkable condition of use wherein $|\theta| \leq 25°$ and Lo=400 mm, $\Delta$L reaches a maximum of 41.4 mm.

To correct such variation in the length of the light path, it is disclosed in Japanese Patent Publication No. 9182/1975 that parallel-movable mirrors are provided before and behind the projection optical system leading from the rotatable mirror to the image plane to correct the variation in the length of the light path and that the projection optical system is moved to eliminate any fluctuation of the conjugate arrangement. Also, U.S. Pat. No. 3,537,373 discloses that two lens elements within the projection optical system are synchronously operated parallel to the optic axis to thereby eliminate any variation in the length of the light path and any fluctuation of the conjugate arrangement.

However, it has been found that the use of a rotatable mirror in a copying apparatus raises another difficult problem in addition to the variation in the length of the light path. It is a problem that the original 1 falls in accordance with the angle of rotation of the rotatable mirror 2, as viewed from the photosensitive medium surface 6 side. That is, if a mirror image 4 of the slit portion original 3 by the rotatable mirror 2 is considered, the mirror image 4 is inclined by the angle of rotation $\theta$ of the mirror 2 with respect to the optic axis of the projection optical system 5. (This state will hereinafter be referred to as the swing and tilting.) The image 7 of the slit portion original 3 on the photosensitive medium surface 6 by the projection optical system 5 is also made to swing and tilt by $\theta$. This phenomenon is such that where the copying apparatus is used with the slit width lo of 10 mm and with the effective F-number of the copying optical system being 10, the out-of-focus width $\Delta$l' of the slit image 7 on the photosensitive medium 6 is as great as 0.2 mm in the case of $\theta=25°$, as shown in FIG. 2 of the accompanying drawings, and such out-of-focus width is practically impermissible.

SUMMARY OF THE INVENTION

It is an object of the present invention to provide a copying apparatus having a rotatable scanning mirror type optical system in which the length of the light path is corrected while the image forming magnification (lateral magnification) is maintained constant and the falling of the image projected on a photosensitive medium is also corrected.

It is a further object of the present invetion to provide a copying apparatus having an optical system in which the variation in image forming magnification in the orthogonal directions on the image forming plane caused by the correcting means for the falling of the image is also corrected as will hereinafter be described.

It is still a further object of the present invention to provide a copying apparatus having a magnification changing function which enables selection to a desired value of the image forming magnification of the image of an original formed on a photosensitive medium.

In the copying apparatus according to the present invention, the above-described objects are achieved by providing an image forming optical system disposed between a rotatable scanning type deflector and a photosensitive medium with optical means for correcting the swing and tilting of the image of an original on the photosensitive medium surface and optical means for maintaining constant the image forming magnification at which the original surface is projected onto the photosensitive medium surface during the operation of the deflector and for always maintaining the original surface and the photosensitive medium surface conjugate. That is, in the copying apparatus of the present invention, the image forming optical system has a light path length correcting optical system having at least two movable optical elements movable along the optic axis and having the function of correcting the length of the light path while maintaining a predetermined image forming magnification, and a swing and tilting optical system in which the angle formed by the optic axis thereof with respect to the optic axis of the correcting optical system is variable with time in synchronism with the operation of the deflector, thereby forming the image of an original on the photosensitive medium without swing and tilting.

Further, in the copying apparatus according to the present invention, an anamorphic optical system is provided between the original and the photosensitive medium surface as the means for correcting the difference in image forming magnification of the original image on the photosensitive medium surface in the orthogonal directions, namely, the swing and tilting cross-sectional direction and the direction orthogonal to the swing and tilting cross-section, caused by the swing and tilting of the swing and tilting lens system.

Still further, in the copying apparatus according to the present invention, a magnification changing image forming optical system for varying the image forming magnification of the image of the original formed on the photosensitive medium to a desired value is disposed between the deflector and the photosensitive medium. This magnification changing image forming optical system effects magnification change by at least a part of the optical elements forming this optical system being moved in the direction of the optic axis or being substituted by another image forming optical system.

Other features and effects of the copying apparatus according to the present invention will become apparent from the following detailed description taken in conjunction with the accompanying drawings.

BRIEF DESCRIPTION OF THE DRAWINGS

FIG. 1 is a schematic view showing an example of the conventional exposure scanning system using a rotatable scanning mirror.

FIG. 2 shows the amount of out-of-focus caused by the falling of the image plane.

FIG. 3 illustrates the principle of the swing and tilting lens.

FIG. 4 illustrates the swing and tilting lens system applied to the present invention.

FIGS. 5(A) and (B) show the state of an original surface being imaged on a photosensitive medium surface.

DESCRIPTION OF THE PREFERRED EMBODIMENTS

Figure 6:
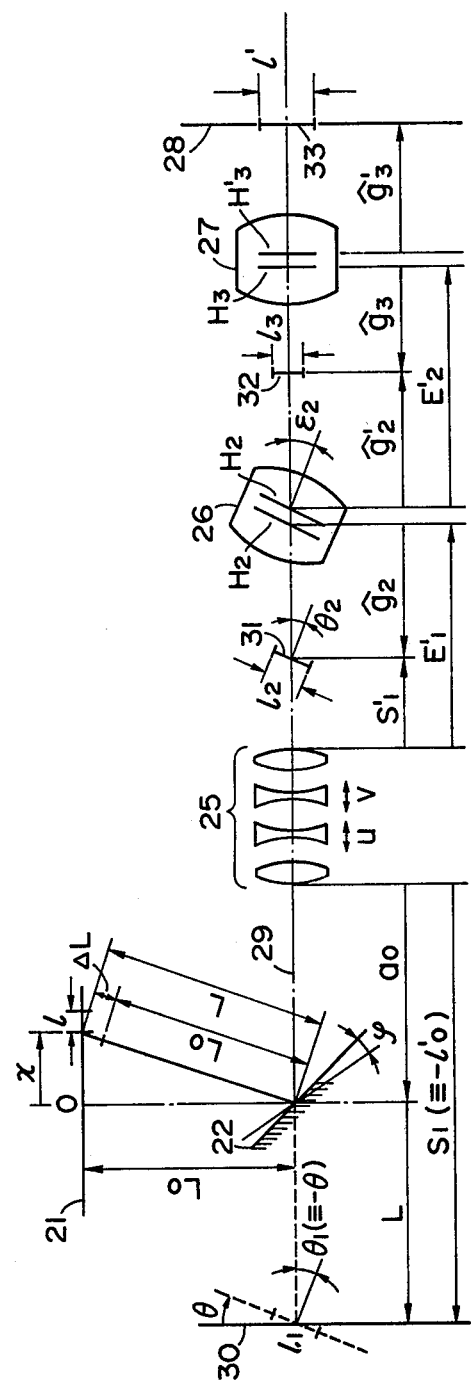
FIG. 6 quantitatively illustrates the present invention.

Referring is first had to FIG. 3 to describe the basic image forming relation of a swing and tilting lens. In FIG. 3, it is assumed that if the plane normal to an object plane 12 has an inclination of $\theta$ with respect to a predetermined optic axis 11 in the shown cross-section (hereinafter referred to as the swing and tilting cross-section) and an image forming lens system 13 has an inclination of $\epsilon$ about its principal point H on the object side, the plane normal to an image forming plane 14 on which the object plane 13 is imaged by the image forming lens system 13 has an inclination of $\theta'$ with respect to the optic axis 15 on the image forming side.

The optic axis 15 on the image forming side passes through the principal point H' on the image plane side of the image forming lens system 13 and is parallel to the aforementioned optic axis 11. The object plane 12 is at a distance $\hat{g}$ from the foward principal point H of the lens system 13 along the optic axis 11, and the image forming plane 14 is at a distance $\hat{g}'$ from the rearward principal point H' along the optic axis 15. The sign of $\hat{g}$ and $\hat{g}'$ positive when viewed rightwardly from the base point, and negative when viewed leftwardly from the base point and thus, in FIG. 3, $\hat{g}<0$ and $\hat{g}'>0$. As regards the angles $\theta$, $\epsilon$ and $\theta'$, they are of the positive sign when measured counterclockwisely from the optic axis 11, 15, and of the nagative sign when measured clockwisely from the optic axis 11, 15. Here, the relation between $\hat{g}$ and $\hat{g}'$ is given by the following equation:

$$1/\hat{g}' = 1/\hat{g} + \cos \epsilon / f \qquad (1)$$

where f is the focal length of the lens system 13. Also, it can be explained from the ideal image formation theory that the relation between $\theta$ and $\theta'$ is given by $$\tan \theta' = \frac{f \cdot \tan\theta + \hat{g} \sin\epsilon}{f + \hat{g} \cos\epsilon} \qquad (2)$$

$$= \frac{1}{f} \{(f - \hat{g}' \cos\epsilon) \tan\theta + \hat{g}' \sin\epsilon\} \qquad (2)'$$

Further, when the lens system is made to swing and tilt, even if the lens system is a spherical lens system, the lateral magnification $\beta y$ in the swing and tilting cross-section differs from the lateral magnification $\beta z$ in a cross-sectional orthogonal to the swing and tilting cross-section. If, as shown in FIG. 3, the length of the object in the swing and tilting cross-section is ly, the length of the image is l'y, the length of the object in a cross-section perpendicular to the swing and tilting cross-section is lz, and the length of the image is l'z, then there are the following relations:

$$\beta y = l'y/ly = (\cos \theta / \cos \theta') \times \beta o \qquad (3)$$

$$\beta z = l'z/lz = \beta o \qquad (4)$$

$$\beta o = \frac{f}{f + \hat{g} \cos\epsilon} = \frac{f - \hat{g}' \cos\epsilon}{f} \qquad (5)$$

$\beta o$ represents the lateral magnification of the image forming lens system when no swing and tilting is present in the object plane ($\theta = 0$) or when the image forming lens system 13 is not made to swing and tilt ($\epsilon = 0$). From equations (3) and (4) above, the following relation is established between $\beta y$ and $\beta z$:

$$(\cos \theta'/\cos \theta)\beta y = \beta z \qquad (6)$$

Further, the the aforementioned ly satisfies $$|f + g \cos \epsilon|^2 >> |(l/2) \cos \theta(\tan \epsilon - \tan \theta) \cos \epsilon|^2 \qquad (6)'$$

In the present invention, the aforementioned ly corresponds to the slit width during the scanning, but it can fully satisfy the condition of equation (6)′.

Detailed description will now be made of a copying optical system of the present invention to which the swing and tilting lens system is applied.

FIG. 4 is a schematic view of the copying optical system for illustrating the swing and tilting lens system applied to the present invention and showing the construction in the swing and tilting cross-section. A flat original surface 21 is scanned from one end to the other end thereof by a flat rotatable mirror 22 rotatable about the rotary axis orthogonal to the plane of the drawing sheet, with a slit width lo controlled by a view field slit 23. A partial original 24 of the original surface controlled by this slit width lo is imaged at a predetermined invariable magnification on a photosensitive medium surface 28 by way of the rotatable mirror 22, a variable path system 25, a swing and tilting lens system 26 and a master lens system 27. The photosensitive medium surface 28 is a plane containing the optic axis 29 of the aforementioned optical system 25, 26, 27 and perpendicular to said optic axis 29, and the photosensitive medium surface 28 is moved in synchronism with the rotation of the rotatable mirror 22. Now, assuming that the position in which the mirror image of the partial original 24 formed by the rotatable mirror 22 is perpendicular to the optic axis 29 is the standard position of the rotatable mirror, the partial original 24 when rotated by an angle $\theta$ from the standard position is inclined by an angle $\theta_1(=-\theta)$ in the swing and tilting cross-section with respect to the optic axis 29 of the optical system 25, 26, 27. To correct this inclination of the original surface and cause the image of the partial original to be coincidently formed on the photosensitive medium surface 28, the swing and tilting lens system 26 is synchronously rotated about an axis passing through the principal point on the image side thereof and perpendicular to the plane of the drawing sheet, namely, is made to swing and tilt.

The rotation of the swing and tilting system 26 causes a variation in the length of the light path between the original surface 21 and the photosensitive medium surface 28, and such variation in the length of the light path and the variation in the length of the light path resulting from the aforementioned rotatin of the rotatable mirror 22 are corrected by a lens element in the variable path system 25 moved in the direction of the optic axis 29.

Thus, by synchronizing all of the rotation of the rotatable mirror 22, the movement of the lens element in the variable path system 25, the swing and tilting of the swing and tilting system 26 and the movement of the photosensitive medium surface 28, the image of the original is formed at a predetermined magnification at a predetermined location on the photosensitive medium surface.

If all of the variable path system 25, the swing and tilting system 26 and the master lens system 27 are formed by rotation-symmetrical optical systems, the projection magnification at which the original surface 21 is projected onto the photosensitive medium surface 28, namely, the copying magnification, generally and necessarily differs from the swing and tilting cross-section to the cross-section orthogonal to the swing and tilting cross-section, as shown by equations (3) and (4) which describe the magnification of the swing and tilting lens in the form of general formulation. The angle of deflection $\theta$ of the scanning by the rotatable mirror 22 corresponds to the angle of inclination $\theta_1(=-\theta)$ of the aforementioned mirror image 30 and the case where this mirror image is formed on the photosensitive medium surface 28 without swing and tilting is the case where the angle $\theta'$ shown in FIG. 3 is zero. Therefore, when $\theta'=0$ is brought about by the swing and tilting system 26, the following relation is established:

$$(1/\cos\theta)\beta Ty = \beta Tz \qquad (7)$$

where $\beta Ty$ represents the projection magnification in the swing and tilting cross-section, and $\beta Tz$ represents the projection magnification in the cross-section orthogonal to the swing and tilting cross-section. Assuming that the desired projection magnification (copying magnification) is $\beta T$, and if the projection magnification is maintained constant by the variable path system 25, two planes which hold the projection magnification are thinkable, namely, the swing and tilting cross-section and the cross-section orthogonal to the swing and tilting cross-section. If the projection magnification $\beta Ty$ in the swing and tilting cross-section is maintained at $\beta T$, $\beta Tz$ is varied to be $$\beta Tz = (1/\cos\theta)\beta T \qquad (8)$$

On the other hand, if the projection magnification in the cross-section perpendicular to the swing and tilting cross-section is maintained at $\beta T$, $\beta Ty$ is expressed as:

$$\beta Ty = \cos\theta \cdot \beta T \qquad (9)$$

The shapes with which the original surface is imaged on the photosensitive medium surface are shown in FIGS. 5(A) and 5(B). FIG. 5(A) refers to the case where $\beta Ty$ is constant, and FIG. 5(B) refers to the case where $\beta Tz$ is constant. In FIG. 5, solid line 35 indicates the shape of the original surface and broken lines 36 and 37 indicate the shape of the image of the original surface projected upon the photosensitive medium surface, and lo represents the slit width with which the original surface is scanned. As shown in FIG. 5, the image 36, 37 obtained as the result of the scanning does not accurately reflect the shape of the original surface. To correct such drawback to obtain $\beta Ty = \beta Tz = \beta T$ and faithfully reproduce the shape of the original surface, an effective portion of the optical system may be formed by an anamorphic system or a new anamorphic system may be added at an appropriate position. This specific optical system will later be described and now, the optical system shown in FIG. 4 will be analyzed by the use of more specific formulations.

FIG. 6 is a drawing in which dimensions are added to the construction view of FIG. 4. Relations regarding the behavior of the rotatable mirror 22 will first be described.

Let X be the scanning position by the rotatable mirror 22 with the center of the original surface 21 as the origin, Lo be the distance from the center of the rotatable mirror 22 to the origin of the original surface, namely, the arm length of the origin, L be the distance from the center of the rotatable mirror 22 to the scanning position, namely, the arm length of the scanning, and $\Delta L = L - Lo$ be the difference between the arm length of the scanning and the arm length of the origin. Also, let $\theta$ be the angle formed between the arm of the origin and the arm during the scanning, namely, the angle of scanning deflection, and $\psi$ be the angle of rotation of the rotatable mirror 22 as viewed from the arm scanning position of the origin. Then, L and θ may be expressed as follows as the relation of X:

$$\begin{cases} \Delta L = \{\sqrt{1+(x/Lo)^2} - 1\}Lo & (10) \\ L = Lo + \Delta L & (11) \end{cases}$$

$$\begin{cases} \theta = \tan^{-1}(x/Lo) & (12) \\ \psi = \theta/2 = \tfrac{1}{2}\tan^{-1}(x/Lo) & (13) \end{cases}$$

That is, when the scanning position X on the original surface is moved at a uniform velocity, the rotatable mirror 22 is rotated so as to satisfy equation (13). The then rotation angle velocity $\omega = (d\psi/dt)$ (t is time) is given by $$\omega = \frac{\tfrac{1}{2}vLo}{Lo^2 + v^2t^2} \qquad (14)$$
$$v = \frac{dx}{dt}$$

Next, let $S_1$ (the amount shown in FIG. 6 is negative) be the amount in which the position of the object (original surface) relative to the variable path system 25, in other words, the position of the mirror image 30 of the original surface 24 by the rotatable mirror 22, has been measured from the first lens element of the variable path system, and $a_o$ (shown as negative) be the distance from the first lens element to the center of rotation of the rotatable mirror. Then, $$\begin{aligned} e'_o &= -S_1 = e'_{oo} + \Delta L \\ e'_{oo} &= -a_o + Lo \end{aligned} \qquad (15)$$

After all, the position of the object relative to the movement of x through the $\Delta L$ of equation (10), as shown by equation (15). Also, the angle of swing and tilting $\theta_1$ of the object of the variable path system 25 is given as follows by the use of the θ given by equation (12):

$$\theta_1 = -\theta \qquad (16)$$

Here, the angle of swing and filting of the object or the image is defined by the angle formed between the nomal to the object surface of the image surface and the optic axis.

The signs of the notation (see FIG. 6) of the object, image and optical system arranged on the optic axis 7 are defined such that with regard to the vertical dimensions, the right as measured from the starting point is positive and the left as measured from the starting point is negative. Also, as regards the angles such as the angle of swing and tilting, the counter-clockwise direction with the optic axis as the standard is defined as positive, and the clockwise direction is defined as negative. Various quantities in the equations hereinafter used are similar.

It is evident that for the scanning slit with l of the original surface, the size $l_1$ of the mirror image 30 by the rotatable mirror 22 in the swing and tilting cross-section is $$l_1 = -l \qquad (17)$$

Here, the size of the slit image in the swing and tilting cross-section should be considered with a sign attached thereto, with the reversal thereof taken into account.

Thus, the position $S_1$ of the mirror image by the rotatable mirror, the angle of swing and tilting $\theta_1$ and the size $l_1$ of the image have been given on the optic axis 29. Hereinafter, this mirror image 30 will be referred to as an object with respect to the synthetic optical system of the variable path system 25, the swing and tilting lens 26 and the master lens 27 arranged on the optic axis 29, and a method will now be presented whereby such object imaged at a desired magnification on the predetermined photosensitive medium surface 28, namely, the image forming plane of the synthetic optical system, without swing and tilting.

It is to be understood that the synthetic optical system is arranged by presetting $E_1'$ and $E_2'$ where $E_1'$ is the distance from the last element of the variable path system to the forward principal point $H_2$ of the swing and tilting lens and $E_2'$ is the distance from the rearward principal point $H_2'$ of the swing and tilting lens to the forward principal point $H_3$ of the master lens. It is also to be understood that the photosensitive medium surface 28 is installed at a distance $\hat{g}_3'$ from the rearward principal point $H_3'$ of the master lens 27.

Now, let $\beta_{y1}$ be the lateral magnification of the variable path system relative to the object 30 in the swing and tilting cross-section, $\beta_{z1}$ be the lateral magnification of the variable path system relative to the object 30 in the cross-section orthogonal to the swing and tilting cross-section, $S_1$ be the distance between the last lens element of the variable path system and the position of the image 31 of the object by the variable path system, $l_2$ be the then size of the image 31 in the swing and tilting cross-section, and $\theta_2$ be the angle of swing and tilting thereof. Further, let $\beta_{y2}$ and $\beta_{z2}$ be the lateral magnifications of the swing and tilting lens 26, $\hat{g}_2$ be the distance from the forward principal point $H_2$ of the swing and tilting lens to the image 31, $\hat{g}_2'$ be the distance from the rearward principal point $H_2'$ of the swing and tilting lens to an image 32 which is the image of the image 31 re-formed by the swing and tilting lens 26, $l_3$ be the then size of the image 32 in the swing and tilting cross-section, $\theta_3$ be the angle of swing and tilting thereof, and $\epsilon_2$ be the angle of swing and tilting of the swing and tilting of the swing and tilting lens 26. Further, let $\beta_3$ be the lateral magnification of the master lens 27, $\hat{g}_3$ be the distance from the forward principal point $H_3$ of the master lens to the image 32, $\hat{g}_3'$ be the distance from the rearward principal point $H_3'$ of the master lens to an image 33 which is the image of the image 32 re-formed on the photosensitive medium surface 28 by the master lens, and $l'$ be the size of the image 33 in the swing and tilting cross-section. Since the swing and tilting of the image 32 by the swing and tilting lens 26 has been corrected, $\theta_3 = 0$. Therefore, the lateral magnification of the master lens need not be considered as to its two components.

Therefore, the image forming magnifications $\beta_{Ty}$ and $\beta_{Tz}$ of the synthetic optical system 25, 26, 27 are related thus:

$$\begin{cases} \dfrac{l'}{l_1} \equiv \beta_{Ty} = \beta_{y1} \times \beta_{y2} \times \beta_3 & (18) \\ \beta_{Tz} = \beta_{z1} \times \beta_{z2} \times \beta_3 & (19) \end{cases}$$

$\beta_3$ may be expressed as follows by the use of the set value $\hat{g}_3'$ and the focal length $f_3$ of the master lens and by applying equation (4) to this lens as a state without swing and tilting:

$$\beta_3 = (f_3 - \hat{g}_3')/f_3 \qquad (20)$$

and $$\hat{g}_3' = \hat{g}_3'/\beta_3 \tag{21}$$

Next, $\beta_{y2}$ and $\beta_{z2}$ may be expressed as follows by the use of the following equation from the set value $E'_2$ which is the distance between the principal points of the swing and tilting lens 26 and the master lens 27

$$\hat{g}_2' = E'_2 + \hat{g}_3 \tag{22}$$

and by the use of $\hat{g}_2'$ from equations (3) and (4)

$$\beta_{y2} = \frac{\cos\theta_2}{\cos\theta_3} \times \frac{f_2 - \hat{g}_2 \cos\epsilon_2}{f_2} \tag{23}$$

$$\beta_{z2} = \frac{f_2 - \hat{g}_2 \cos\epsilon_2}{f_2} \tag{24}$$

where $f_2$ is the focal length of the swing and tilting lens. Further, since the variable path system itself does not swing and tilt, $\beta_{y1}$ and $\beta_{z1}$ may be expressed as follows, also from equations (3) and (4), with $\beta_{o1}$ as the lateral magnification of the variable path system when there is no swing and tilting of the object:

$$\beta_{y1} = (\cos\theta_1/\cos\theta_2) \times \beta_{o1} \tag{25}$$

$$\beta_{z1} = \beta_{o1} \tag{26}$$

From these relations, $\beta_{Ty}$ and $\beta_{Tz}$ may after all be expressed as follows, by the use of the known set differences having no relation to the scanning, namely, $\beta_3$, $\hat{g}_2'$ and $f_2$:

$$\beta_{Ty} = \left(\frac{\cos\theta_1}{\cos\theta_3}\right) \times \beta_{o1} \times \frac{f_2 - \hat{g}_2 \cos\epsilon_2}{f_2} \times \beta_3 \tag{18}'$$

$$\beta_{Tz} = \beta_{o1} \times \frac{f_2 - \hat{g}_2 \cos\epsilon_2}{f_2} \times \beta_3 (=\beta_{oT}) \tag{19}'$$

It is thus seen that $\beta_{Ty}$ and $\beta_{Tz}$ differ from each other by the ratio ($\cos\theta_1/\cos\theta_3$). In this equation, $\theta_3$ disappears by relating the angle of swing and tilting $\epsilon_2$ of the swing and tilting lens to $\theta_1$ so that $\theta_3 = 0$. This relation will now be described.

First, the relation between $\theta_1$ and $\theta_2$ is obtained as follows, from equation (5) by applying equation (2) to the variable path system:

$$\tan\theta_2 = \beta_{o1}\tan\theta_1 = -\beta_{o1}\tan\theta (\text{cf: equation 16}) \tag{27}$$

Also, the relation between $\theta_2$ and $\theta_3$ is obtained as follows, by applying equation (2) to the swing and tilting lens:

$$\tan\theta_3 = (1/f_2)\{(f_2 - \hat{g}_2\cos'\epsilon_2)\tan\theta_2 + \hat{g}_2' \sin\epsilon_2\} \tag{28}$$

Here, $\beta_{o1}$ is required to have $\beta_{oT}$ as the desired value because $\beta_{oT}$ is combined with the desired copying magnification $\beta_T$ from equation (18)' or (19)'. That is, $$\beta_{o1} = \frac{f_2}{f_2 - \hat{g}_2 \cos\epsilon_2} \times \left(\frac{\beta_{oT}}{\beta_3}\right) \tag{29}$$

where $$\beta_{oT} = \beta_{Tz} = (1/\cos\theta)\beta_{Tz} \tag{30}$$

In the foregoing, the falling of the image after the swing and tilting lens is corrected by the swing and tilting lens and therefore, it can be solved by using equations (27), (28) and (29) simultaneously under the condition of the angle of falling $\theta_3 = 0$. As the result, the set values $\beta_3$, $f_2$, $\hat{g}_2'$ and $\beta_{Ot}$ and further, $\epsilon_2$ and $\beta_{o1}$ as a function of $\theta$ may be determined by the following means "1"–"5".

| | | |
|---|---|---|
| ① | $\beta_{OT} = \frac{1}{\cos\theta} \beta_T$ | The magnification of the swing and tilting cross-section is constant. ($\beta_{Ty} = \beta_T, \beta_{Tz} = \frac{\beta_T}{\cos\theta}$) |
| | $= \beta_T$ | The magnification of the cross-orthogonal to the swing and tilting cross-section is constant. $\beta_{Ty} = \cos\theta \beta_T, \beta_{Tz} = \beta_T$ |
| | $= \alpha \beta_T$ | The magnification of the cross-section orthogonal to the swing and tilting cross-section is arbitrary and constant. |

$$\beta_{Ty} = (\alpha\cos\theta)\beta_T, \beta_{Tz} = \alpha\beta_T$$

where $\beta_T$ is the copying magnification and $\alpha$ is a constant determined by specification.

$$2 \quad M = \left(\frac{\beta_{oT}}{\beta_3}\right) \tan\theta \tag{31}$$

$$3 \quad \tan\theta_2 = -\left(\frac{f_2}{\hat{g}_2}\right) M \times \frac{1}{\frac{f_2}{\hat{g}_2} - \sqrt{1 - \left(\frac{f_2}{\hat{g}_2}\right)^2 M^2}} \tag{32}$$

where $$\left|\frac{f_2}{\hat{g}_2}\right| < \frac{1}{\sqrt{M^2 + 1}} \tag{33}$$

$$4 \quad \cos\epsilon_2 = \frac{f_2 \tan^2\theta_2 + \hat{g}_2 \sqrt{(1 + \tan^2\theta_2 - \left(\frac{f_2}{\hat{g}_2}\right)^2 \tan^2\theta_2}}{\hat{g}_2(1 + \tan^2\theta_2)} \tag{34}$$

$$\sin\epsilon_2 = \frac{\tan\theta_2[-f_2 + \hat{g}_2 \sqrt{(1 + \tan^2\theta_2 - \left(\frac{f_2}{\hat{g}_2}\right)^2 \tan^2\theta_2}]}{\hat{g}_2(1 + \tan^2\theta_2)} \tag{35}$$

$$\beta_{o1} = \frac{f_2}{f_2 - \hat{g}_2 \cos\epsilon_2} \times \left(\frac{\beta_{oT}}{\beta_3}\right) \tag{29}$$

The $\beta_{o1}$ determined by procedure "5" above may be realized by moving two elements in the variable path system and this will later be described.

The swing and tilting lens is made to swing and tilt with the scanning deflection angle $\theta$ in accordance with equation (34) or (35) and it is pointed out that the conjugate arrangement of the swing and tilting lens is varied along with this. In the present invention, the image forming position of the swing and tilting lens, namely, $\hat{g}_2'$, is invariable during the scanning, so the position of the object relative to the swing and tilting lens 26 is varied. This means that it is equivalent to the variation in the image forming position $S'_1$ of the variable path system. That is, the set value $E_1'$ and $S_1'$ and $\hat{g}_2$ are given by $$S_1' = E_1' + \hat{g}_2 \tag{36}$$

(see FIG. 6).

The variation $\Delta\hat{g}_2$ in $\hat{g}_2$ by $\epsilon_2$ is determined by applying equation (1) to this. That is, if $\Delta\hat{g}_2$ is determined with $\hat{g}_{20}\equiv(\hat{g}_2)\epsilon_2=0$ when there is no swing and tilting as the standard and if the variation $\Delta S_1'$ and $S_1'$ determined with $S_{10}'\equiv(S_1')\theta=0$ when there is no swing and tilting as the standard, the image forming position $S_1'$ of the variable path system 51 may be determined from the following equation by the use of $\epsilon_2$.

$$S_1' = S_{10}' + \Delta S_1' \tag{37}$$

where $$\Delta S_1' = \Delta \hat{g}_2 = \frac{-f_2 \hat{g}_2^2 (1 - \cos\epsilon_2)}{(f_2 - \hat{g}_2)(f_2 - \hat{g}_2 \cos\epsilon_2)} \tag{38}$$

As has been described in detail, all of the fluctuation of $S_1$ by the rotatable mirror 22 (see equation (15)), and the resultant swing and tilting behavior of the swing and tilting lens for imaging the object (mirror image) 30 without swing and tilting (see equations (34) and (35)), and the resultant variation in $S_1'$ (see equation (38)) and the fluctuation of magnification $\beta_{o1}$ (see equation (29)) can be described by the use of the scanning position x of the original surface through the scanning deflection angle $\theta$.

Next, how the fluctuation of $S_1$, the variation in $S_1'$ and the fluctuation of $\beta_{o1}$ are related together by moving the two movalbe elements in the variable path system 25 will be clearly shown by specific means.

Here, description will be made of the fact that when $e_o'(\equiv -S_1)$, $S_1'$ and $\beta_{o1}$ are given, the amounts of movement of the two movable elements are given with $\theta=0$ as the standard position.

Figure 7:
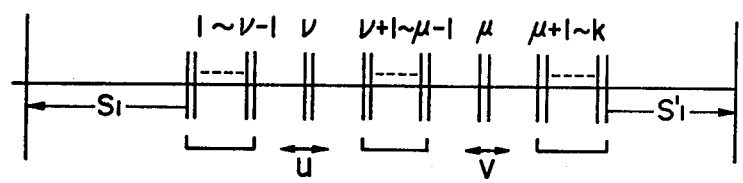
FIG. 7 is a schematic illustrating the general construction of a variable path system.

As shown in FIG. 7, it is to be understood that the variable path system generally comprises k elements, that of these elements, the $\nu$th and the $\mu$th element ($1 \leq \nu < \mu \leq k$) are movable and that the amounts of movement thereof are indicated by u and v are positive when movement occurs rightwardly from the starting point. In this variable path system, the arrangement of $u=v=0$ is called the initial arrangement and it is to be understood that this state just corresponds to the scanning deflection angle $\theta=0$, namely, the state without swing and tilting.

Figure 8:
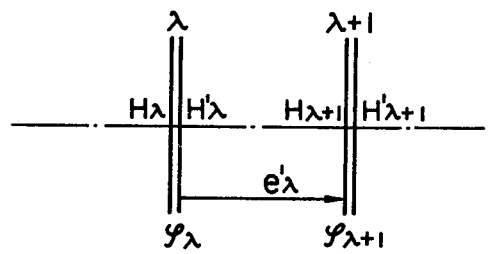
FIG. 8 illustrates the symbols of the power arrangement.

The power arrangement of this variable path system will first be described. The refractive powers of the first to the kth element are successively expressed as $\psi_1, \psi_2, \ldots, \psi\nu, \ldots \psi\mu, \ldots, \psi_k$ and the intervals between the successive elements at the initial arrangement are expressed as $e_1', e_2', \ldots, e_{k-1}'$. $\psi_\lambda(\lambda=1, \ldots, k)$ is the inverse number of the focal length of the $\lambda$th element and, as shown in FIG. 8, $e_\lambda'(\lambda=1, \ldots, k-)$ is the distance from the rearward principal point $H\lambda$ of the $\lambda$th element to the forward principal point $H\lambda+1$ of the $\lambda+1$th element indicated in a conversion amount +(an amount obtained by dividing the actual dimension by the refractive index of the medium).

Further, if the object surface relative to the variable path system is expressed in suffix O and the image forming plane of this system is expressed in suffix k+1 and if $$e_o'(\theta) \equiv -S_1, \quad e_k'(\theta) \equiv S_1' \tag{39}$$

is used as new symbols, then the object surface of refractive power O and the image forming plane can be regarded as part of the optical system arrangement and this will be convenient for the subsequent treatment.

However, it should be noted that $e'\lambda(\lambda=1, \ldots, k-1)$ is the amount of the initial arrangement while $e_o'(\theta)$ and $e_k'(\theta)$ are amounts variable as a function of $\theta$.

Since the lateral magnification $\beta_{o1}$ is also a function of $\theta$, this will hereinafter be expressed newly as $\beta_{o1}(\theta)$.

Here, assuming that the initial arrangement is given, it can be pointed out from the theory of paraxial imaging that if one of $e_o'(0)$, $e_k'(0)$ and $\beta_{o1}(0)$ is determined, the other two are automatically determined and therefore, the initial arrangement of the variable path system must be determined without contradiction when it is set. In fact, even when the initial arrangement and $\beta_{o1}(0)$ are given, $e_o'(0)$ may have the rotatable mirror position $a_o$ (see equation (15)) and $e_k'(0)$ may itself have a certain degree of option in designing and therefore, it is also possible to determine $e_o'(0)$ and $e_k'(0)$ from $\beta_{o1}(0)$.

In view of the above-described circumstances, description will hereinafter be made of a method of determining the amounts of movement u and v of the $\nu$th and the $\mu$th element so as to satisfy $e_o'(\theta)$, $e_k'(\theta)$ and $\beta_{o1}(\theta)$, assuming that these are given relative to the initial arrangement and $\theta$. The technique of Gaussian Brackets is useful as the technical means for this method.

That is, the Gaussian Bracket of an arbitrary element array $a_1, a_2, \ldots, a_n$ is expressed as $[a_1, a_2, \ldots, a_n]$ and defined by the following recurrence formula:

$$\begin{cases} [\ ] = 1 \text{ (blank Gaussian Bracket)} \\ [a] = a \\ [a_1, a_2, \ldots a_n] = a_1[a_2, a_3, \ldots, a_n] + [a_3, \ldots, a_n] \end{cases} \tag{40}$$

From this, various expansion formulas may be established and among them, the formulas necessary here are shown below.

$$\begin{cases} [a_1, a_2, \ldots, a_n] = [a_1, \ldots, a_{n-1}]a_n + [a_1, \ldots, a_{n-2}] \\ \qquad = [a_1, \ldots, a_{\lambda-1}]a_\lambda[a_{\lambda+1}, \ldots, a_n] \\ \qquad + [a_1, \ldots, a_{\lambda-1}, 0, a_{\lambda+1}, \ldots, a_n] \\ \qquad = [a_1, \ldots, a_\lambda][a_{\lambda+1}, \ldots, a_n] \\ \qquad + [a_1, \ldots, a_{\lambda-1}][a_{\lambda+2}, \ldots, a_n] \end{cases} \tag{41}$$

Also, $[a_1, a_2, \ldots, a_{\lambda-1}, 0, a_{\lambda+1}, \ldots, a_n]$
$[a_1, \ldots, a_{\lambda-2}, a_{\lambda-1}, a_{\lambda+1}, a_{\lambda+2}, \ldots, a_n]$ (42)

When this Gaussian Bracket is applied to an optical system comprising a power arrangement from the lth element to the mth element (l, m ($\geq 0$ being arbitrary), it may be combined with the following four paraxial characteristic quantities which differ in property from one another.

$$\begin{aligned} l_{Am} &\equiv [\phi_l, -e_l, \phi_{l+1}, -e_{l+1}', \ldots, \phi_{m-1}, -e_{m-1}'] \\ l_{Bm} &\equiv [-e_l, \phi_{l+1}, -e_{l+1}', \ldots, \phi_{m-1}, -e_{m-1}'] \\ l_{Cm} &\equiv [\phi_l, -e_l, \phi_{l+1}, -e_{l+1}', \ldots, \phi_{m-1}, -e_{m-1}', \phi_m] \\ l_{Dm} &\equiv [-e_l, \phi_{l+1}, -e_{l+1}', \ldots, \phi_{m-1}, -e_{m-1}', \phi_m] \end{aligned} \tag{43}$$

where it is promised that when $l > m$, $l_{Am}=l_{Dm}=1$, $l_{Cm}=0$ and $l_{Bm}=0$.

Here, the relation $$l_{Am}l_{Dm} - l_{Bm}l_{Cm} = 1 \tag{44}$$

relative to the invariable quantity of Helmholtz Lagrange is always established. These $l_{Am}$, $l_{Bm}$, $l_{Cm}$ and $l_{Dm}$ satisfy the formulas of equations (40) to (42). For example, if the first formula of equation (41) is applied, the following recurrence formulas are obtained:

$$\begin{cases} l_{Am} = l_{Cm-1} \times (-e'_{m-1}) + l_{Am-1} \\ l_{Cm} = l_{Am} \times (\phi_m) + l_{Cm-1} \end{cases} \quad (45)$$

$$\begin{cases} l_{Bm} = l_{Dm-1} \times (-e'_{m-1}) + l_{Bm-1} \\ l_{Dm} = l_{Bm} \times (\phi_m) + l_{Dm-1} \end{cases} \quad (46)$$

Now, with the foregoing basic relations in mind, the following relation can be found between $S_1$ and $S_1'$ from the theory of paraxial imaging:

$$S_1 = \frac{-\{'D_k \times (-S'_1) + {}^1B_k\}}{'C_k \times (-S'_1) + {}^1A_k} \quad (47)$$

Also, between the lateral magnification $\beta_{01}$ and $S_1'$, the following relation can be found:

$$\beta_{01} = {}^1C_k(-S_1') + {}^1A_k \quad (48)$$

However, $'A_k, \ldots, 'C_k$ in this case are expressed in the state of the power arrangement in which the $\nu$th and the $\mu$th element have been moved by the necessary amounts of movement u and v.

When equations (47) and (48) are rearranged by the use of the aforementioned $e_o'(\theta)$, $e_k'(\theta)$ and $\beta_{01}(\theta)$, there is obtained the following fundamental formulas in which the relation between u and v is to be found:

$$\begin{aligned} \beta_{01}(\theta) &= {}^1A_k + 1(u,v;\theta) \\ e_0'(\theta) \times \beta_{01}(\theta) &= {}^1B_k + 1(u,v;\theta) \end{aligned} \quad (49)$$

where $$\begin{cases} {}^1A_{k+1}(u,v;\theta) \equiv [\phi_1, -e'_1, \ldots, \phi_{\nu-1}, -(e'_{\nu-1}+u), \phi_\nu, -(e'_\nu+u), \\ \quad \phi_{\nu+1}, \ldots, \phi_{\mu-1}, -(e'_{\mu-1}+v), \phi_\mu, -(e'_\mu-v), \phi_{\mu+1}, \\ \quad \ldots, -e_k(\theta)] \\ {}^1B_{k+1}(u,v;\theta) \equiv [-e'_1, \ldots, \phi_{\nu-1}, -(e'_{\nu-1}+u), \phi_\nu, (e'_\nu-u), \phi_{\nu+1}, \\ \quad \ldots, \phi_{\mu-1}, -(e'_{\mu-1}+v), \phi_\mu, -(e'_\mu-v), \phi_{\mu+1}, \\ \quad \ldots, -e_k(\theta)] \end{cases} \quad (50)$$

When the right side of equation (50) is developed and rearranged with respect to u and v by the utilization of the fundamental formulas (41)–(42) of Gaussian Brackets, the following equations are obtained:

$$\begin{cases} {}^1A_{k+1}(u,v;\theta) = F_1(u,v)^\mu A_{k+1}(\theta) + F_2(u,v)^\mu B_{k+1}(\theta) \\ {}^1B_{k+1}(u,v;\theta) = \widetilde{F}_1(u,v)^\mu A_{k+1}(\theta) + \widetilde{F}_2(u,v)^\mu B_{k+1}(\theta) \end{cases} \quad (51)$$

where $$\begin{cases} F_1(u,v) = f_1(u)g_1(v) + f_2(u)h_1(v) \\ F_2(u,v) = f_1(u)g_2(v) + f_2(u)h_2(v) \end{cases} \quad (52)$$

$$\begin{cases} \widetilde{F}_1(u,v) = \widetilde{f}_1(u)g_1(v) + \widetilde{f}_2(u)h_1(v) \\ \widetilde{F}_2(u,v) = \widetilde{f}_1(u)g_1(v) + \widetilde{f}_2(u)h_2(v) \end{cases} \quad (53)$$

$$\begin{cases} f_1(u) = -{}^1C_{\nu-1}\phi_\nu u^2 + {}^1A_\nu \phi_\nu u + {}^1A_\nu \\ f_2(u) = -{}^1C_{\nu-1}\phi_\nu u + {}^1C_\nu \end{cases} \quad (54)$$

$$\begin{cases} \widetilde{f}_1(u) = -{}^1D_{\nu-1}\phi_\nu u^2 + {}^1B_\nu \phi_\nu u + {}^1B_\nu \\ \widetilde{f}_2(u) = -{}^1D_{\nu-1}\phi_\nu u + {}^1D_\nu \end{cases} \quad (55)$$

-continued $$\begin{cases} g_1(v) \equiv -{}^{\nu+1}C_{\mu-1}\phi_\mu v^2 + {}^{\nu+1}A_\mu \phi_\mu v + {}^{\nu+1}A_\mu \\ g_2(v) \equiv {}^{\nu+1}C_{\mu-1}(\phi_\mu v)^2 - {}^{\nu+1}C_\mu(\phi_\mu v) + {}^{\nu+1}C_{\mu-1} \end{cases} \quad (57)$$

$$\begin{cases} h_1(v) \equiv -{}^\nu D_{\mu-1}\phi_\mu v^2 + {}^\nu B_\mu \phi_\mu v + {}^\nu B_\mu \\ h_2(v) \equiv {}^\nu D_{\mu-1}(\phi_\mu v)^2 - {}^\nu D_\mu(\phi_\mu v) + {}^\nu D_{\mu-1} \end{cases} \quad (58)$$

For these functions, the following functional equations are established:

$$\begin{cases} F_1(u,v)\widetilde{F}_2(u,v) - F_1(u,v)F_2(u,v) = 1 \\ f_1(u)f_2(u) - \widetilde{f}_1(u)f_2(u) = 1 \\ g_1(v)h_2(v) - g_2(v)h_1(v) = 1 \end{cases} \quad (59)$$

and $$\begin{cases} {}^\mu A_{k+1}(\theta) \equiv {}^\mu C_k \times \{-e_k(\theta)\} + {}^\mu A_k \\ {}^\mu B_{k+1}(\theta) \equiv {}^\mu D_k \times \{-e_k(\theta)\} + {}^\mu B_k \end{cases} \quad (60)$$

The various quantities of Gaussian Brackets in equations (54)–(58) and equation (60) are those in the initial arrangement, namely, in the state of $\mu = \nu = D$. After all, the right side of fundamental formula (49) has been developed and rearranged by the amounts of movement u, s and $e_k'(\theta)$. As the result, it is seen that the right side of equation (49) is given by the maximum quadratic homogeneous functions of u and v.

Our purpose is to solve u and v by simultaneously using the two formulas of equation (49).

For this purpose, equation (49) is reconsidered as follows:

$$\begin{cases} \beta_{01}(\theta) = f_1(u)G(v;\theta) + f_2(u)H(v;\theta) \\ e_0'(\theta) \times \beta_{01}(\theta) = \widetilde{f}_1(u)G(v;\theta) + \widetilde{f}_2(u)H(v;\theta) \end{cases} \quad (49')$$

where $$\begin{cases} G(v;\theta) \equiv g_1(v)^\mu A_{k+1}(\theta) + g_2(v)^\mu B_{k+1}(\theta) \\ H(v;\theta) \equiv h_1(v)^\mu A_{k+1}(\theta) + h_2(v)^\mu B_{k+1}(\theta) \end{cases} \quad (61)$$

It is seen that $G(v;\theta)$ are the quadratic equations of v, respectively. Therefore, when equation (49') is solved with respect to $G(v;\theta)$ and $H(v;\theta)$ and the function of u and the function of v are separated into the right and the left side by the use of the function of equation (59), the following is obtained:

$$\begin{cases} G(v;\theta) = \beta_{01}(\theta)\{\widetilde{f}_2(u) - e_0'(\theta) \times f_2(u)\} \\ H(v;\theta) = -\beta_{01}(\theta)\{\widetilde{f}_1(u) - e_0'(\theta) \times f_1(u)\} \end{cases} \quad (62)$$

In equation (62), the left side and the right side are the quadratic functions of v and u, respectively, and it is not so difficult to solve u and v from this if use is made of the conventional analytical technique. For example, by obtaining the first formula of equation (62) as a quadratic equation with respect to v and by substituting this for the second formula and thereby rearranging the same, there is obtained a biquadratic equation regarding u.

It is easy in numerical calculation to obtain this with respect to u. There are maximum four real solutions to be obtained with respect to u, and there are further two sets of real solutions when uv is obtained and thus, there are obtained maximum eight sets of real solutions. It can be simply accomplished by using conventional means to find out, from among these sets of solutions, the set of solutions for the condition which satisfy v=0 when u=0, namely, the condition including the initial arrangement, or alternatively it will be apparent if all of the real solutions are curve-plotted with respect to $\theta$.

Incidentally, in the construction of the variable path system wherein u=v+1 and $\mu=\nu+1$, namely in the construction wherein the two movable elements are adjacent to each other, $\nu+1C\mu-1\equiv 0$, so the left side or the right side of the first formula of equation (62) is a linear function of v or u. Such a construction is often to be found in the so-called zoom system, but it is evident that the prospect will become much better also in the variable path system in the present invention.

It is also evident from the foregoing theory that the variable path system 51 can be provided by minimum two movable elements alone.

Description has hitherto been made of the method for setting the amounts of movement u and v to satisfy $e'_o(\theta)$, $e'_k(\theta)$ and $\beta_{01}(\theta)$ which are required from the conditions of the rotatable mirror scanning and the swing and tilting lens.

In the actual design, however, the power arrangement of the initial arrangement is of course determined by taking into account the relation with the vrious conditions arising from various design specifications so that the amounts of movement u and v can be physically realized. Also, when recalling the point of time whereat the design has been completed, it is sufficiently expected that the amounts of movement u and v as the designed values suffer from some fluctuating of the best image plane obtained in designing and it is therefore a matter of course to absorb such fluctuation and to purposely alter the aforementioned theoretical values minutely in order to fixedly position the best imaging plane as required.

The roles of the master lens 27 will now be described as shown in FIG. 6.

By synchronizing or swinging and tilting the variable path system 25 and the swing and tilting lens 26 through the scanning by the rotatable mirror 22, the rearward image forming position 32 of the swing and tilting lens is spatially fixed, as a result of which the imaging magnification on this image forming plane becomes a predetermined constant value. A first role of the master lens disposed therebehind is to vary the copying magnification from Ix magnification to a reduced magnification as is usually done, or to effect enlarged copying, or to variously vary the copying magnification, namely, to achieve the magnification changing effect. In order to realize this, it is conceivable to construct the master lens as a turret type or into a varifocal system or a zoom lens. A second role is to improve the imaging performance in designing. A third role is that required to construct the entire optical system.

Also, if the copying magnification is fixed, the master lens may extremely be eliminated and this has nothing to do with the essential of the present invention.

In the sense of verifying the principal object of the present invention, a specific example of the power arrangement will be shown here as an embodiment, with the master lens eliminated.

Figure 9:
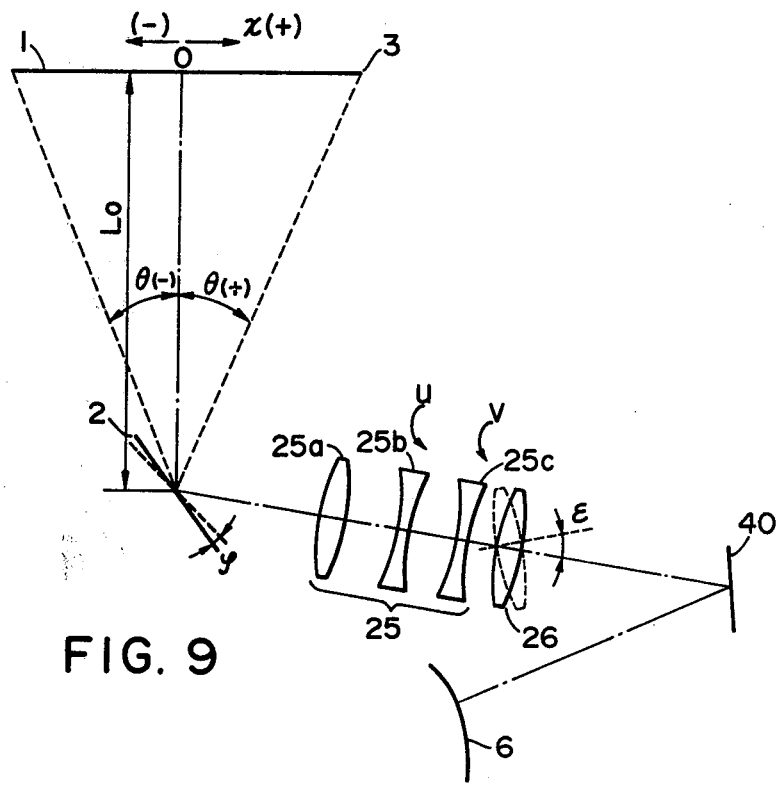
FIG. 9 shows an embodiment of the swing and tilting lens system and the variable path system.

An embodiment of the present invention is shown in FIG. 9 and in Tables 1 and 2.

In the same manner as that already described, the slit exposure portion 3 of a flat original 1 is imaged on a photosensitive medium 6 by way of a rotatable mirror 2, a variable path 25, a swing and tilting lens 26 and a stationary mirror 40.

The variable path system 25 comprises three groups, namely, a first group which is a stationary lens group 25a, a second group which is a movable lens group 25b having an amount of movement u, and a third group which is a movable lens group 25C having an amount of movement v.

The swing and tilting lens 26 comprises a single group. In the present embodiment, the master lens group is eliminated.

Thus, the lens of the present embodiment is a four-group optical lens and the power arrangement of each lens group is as follows:

|  | $\phi(1/f)$ | l |
|---|---|---|
| 1st group | 0.0067 | 80. |
| 2nd group | −0.011 | 30. |
| 3rd group | −0.006 | 30. |
| 4th group | 0.008 |  |

In this power arrangement, when the image forming magnification $\beta T_y$ in the swing and tilting cross-section is maintained constant and when the slit exposure portion is scanned by x from the origin of the flat original 1, the angle of rotation of the mirror is $\psi$, the scanning deflection angle is $\theta$, the distance from the slit exposure portion 3 through the rotatable mirror 2 to the first lens group is $S_1$, the amounts of movement of the movable lens groups 25b and 25c are u and v, respectively, the angle of swing and tilting of the swing and tilting lens 26 is $\epsilon$, the distance from the swing and tilting lens 26 through the sttionary mirror 40 to the photosensitive medium 6 is $\hat{g}_3$, and the $\beta T_y$ of the entire swing and tilting cross-section is as shown in Table 1.

In this case, the distance $L_o$ from the origin O of the original 1 to the rotatable mirror 2 is 400 mm.

TABLE 1

| x(mm) | $\phi$(o) | $\theta$(o) | $S_1$(mm) | u(mm) | v(mm) | $\xi$(o) | (mm) $g_3(=si)$ | $\beta(T_y)$ |
|---|---|---|---|---|---|---|---|---|
| −250 | −16.0027 | −32.0054 | −812.726 | 7.628 | 18.965 | 9.719 | 545.732 | −1 |
| −200 | −13.2825 | −26.5651 | −788.241 | 5.478 | 12.412 | 7.806 | 545.732 | −1 |
| −150 | −10.2780 | −20.5561 | −768.228 | 3.394 | 7.099 | 5.263 | 545.732 | −1 |
| −100 | −7.0181 | −14.0363 | −753.338 | 1.623 | 3.190 | 3.384 | 545.732 | −1 |
| −50 | −3.5625 | −7.1250 | −744.140 | 0.425 | 0.803 | 1.653 | 545.732 | −1 |
| 0 | 0 | 0 | −741.027 | 0 | 0 | 0 | 545.732 | −1 |
| 50 | 3.5625 | −7.1250 | −744.140 | 0.425 | 0.803 | −1.653 | 545.732 | −1 |
| 100 | 7.0181 | 14.0363 | −753.338 | 1.623 | 3.190 | −3.384 | 545.732 | −1 |
| 150 | 10.2780 | 20.5561 | −768.228 | 3.394 | 7.009 | −5.263 | 545.732 | −1 |
| 200 | 13.2825 | 26.5651 | −788.241 | 5.478 | 12.412 | −7.806 | 545.732 | −1 |
| 250 | 16.0027 | 32.0054 | −812.726 | 7.628 | 18.965 | −9.714 | 545.732 | −1 |

Table 2 below shows the relation between movements u and v in the foregoing power arrangement for rendering constant the image forming magnification $\beta T_z$ in the cross-section orthogonal to the swing and tilting cross-section.

TABLE 2

| x(mm) | φ(o) | θ(o) | S₁(mm) | u(mm) | v | ξ | g₃ | β(Tz) |
|---|---|---|---|---|---|---|---|---|
| −250 | −16.0027 | −32.0054 | −812.726 | 1.489 | 6.733 | 8.231 | 545.732 | −1 |
| −200 | −13.2825 | −26.5651 | −788.241 | 1.023 | 4.477 | 6.576 | 545.732 | −1 |
| −150 | −10.2780 | −20.5561 | −768.228 | 0.611 | 2.600 | 4.927 | 545.732 | −1 |
| −100 | −7.0181 | −14.0363 | −753.338 | 0.248 | 1.184 | 3.283 | 545.732 | −1 |
| −50 | −3.5625 | −7.1250 | −744.140 | 0.073 | 0.300 | 1.641 | 545.732 | −1 |
| 0 | 0 | 0 | −741.027 | 0 | 0 | 0 | 545.732 | −1 |
| 50 | 3.5625 | 7.1250 | −744.140 | 0.073 | 0.300 | −1.641 | 545.732 | −1 |
| 100 | 7.0181 | 14.0363 | −753.338 | 0.284 | 1.184 | −3.283 | 545.732 | −1 |
| 150 | 10.2780 | 20.5561 | −768.228 | 0.611 | 2.600 | −4.927 | 545.732 | −1 |
| 200 | 13.2825 | 26.5651 | −788.241 | 1.023 | 4.477 | −6.576 | 545.732 | −1 |
| 250 | 16.0027 | 32.0054 | −812.726 | 1.489 | 6.733 | −8.231 | 545.732 | −1 |

Figure 10:
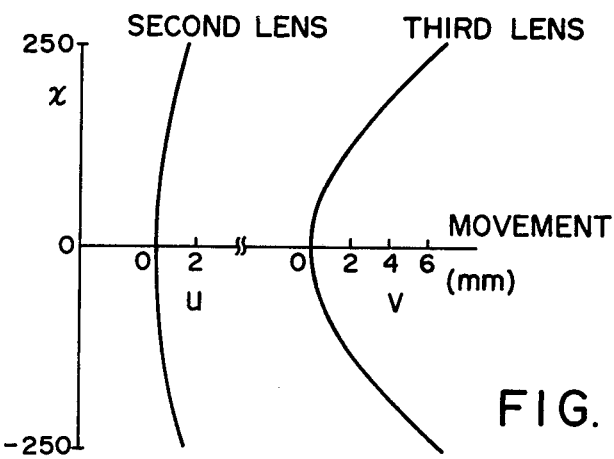
FIGS. 10 and 11 illustrate the movement relation between the two movable lens groups of the variable path system shown in FIG. 9.

FIG. 10 graphically illustrates the movement relation of the amounts of movement u and v of the movable lenses 25b and 25c of the variable path system 25 in the swing and tilting cross-section.

Figure 11:
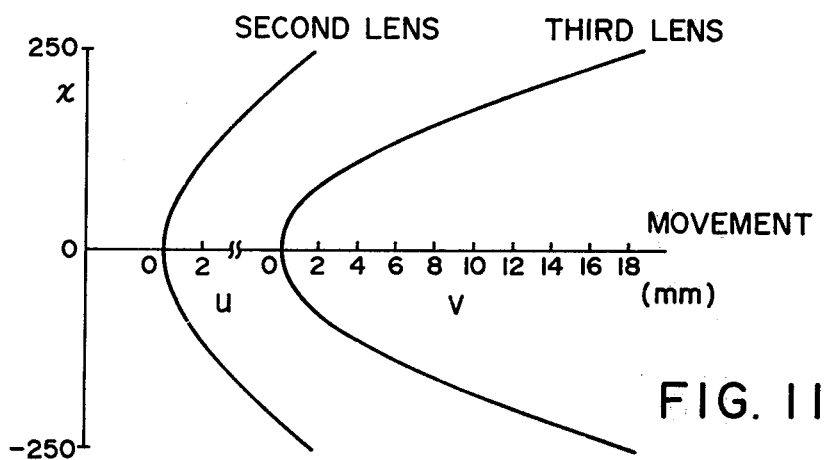

FIG. 11 graphically illustrates the amounts of movement u and v when the image forming magnification βz of the cross-section orthogonal to the swing and tilting cross-section is constant.

In carrying out the present invention, in addition to the hitherto described sychronization operating mechanism by the scanning, there is required a method which corrects the ratio of the projection magnifications $\ominus_{Ty}$ in the swing and tilting cross-section to the projection magnification $\beta_{Tz}$ in the cross-section orthogonal to the swing and tilting cross-section varying by cosine of the scanning deflection angle θ of the rotatable mirror, namely, cos θ and realizes $\Gamma_{Ty}=\beta_{Tz}=\beta_T$ (copying magnification) as the result.

This will be described. First, the fundamental concept presenting the method is this: if one knows the phenomena of FIGS. 5(A) and (B), one will notice that one can regard the scanned original image surface as follows, correspondingly to the scanning which provides $\beta_{Ty}=\beta_T$ and the scanning which provides $\beta_{Tz}=\beta_T$.

Figures 12A, 12B:
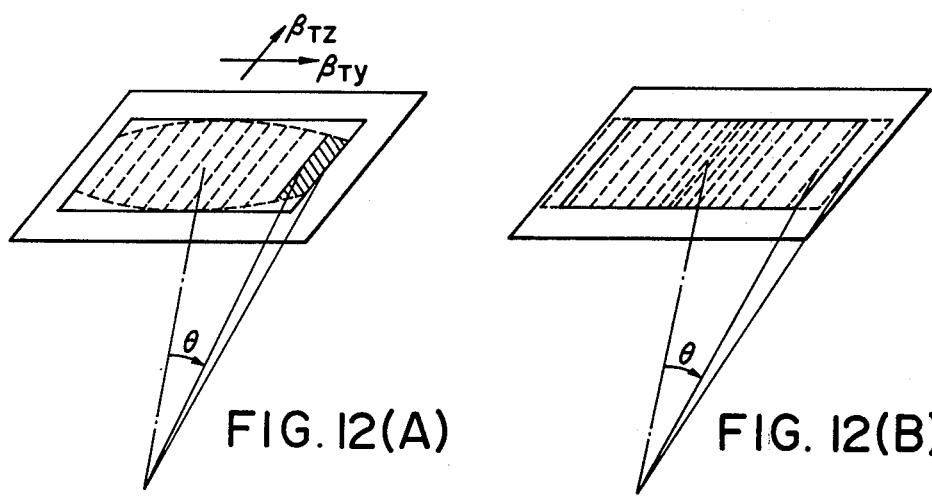
FIGS. 12(A) and (B) illustrate the relation between the scanning deflection angle $\theta$ and the original surface imaged on the photosensitive medium surface.

(A) In the scanning which satisfies the condition of $\beta_{Ty}=\beta_T$, only the component of the direction orthogonal to the scanning direction of the original image in the direction of the scanning deflection angle θ as shown in FIG. 12(A) (this being the z-direction) uniformly reduced by cos θ; and (B) In the scanning which satisfies the condition of βTz=βT, only the component of the scanning direction of the original image in the direction of the scanning deflection angle θ as shown in FIG. 12(B) (this being the y-direction) expanded by 1/cos θ.

Figure 13:
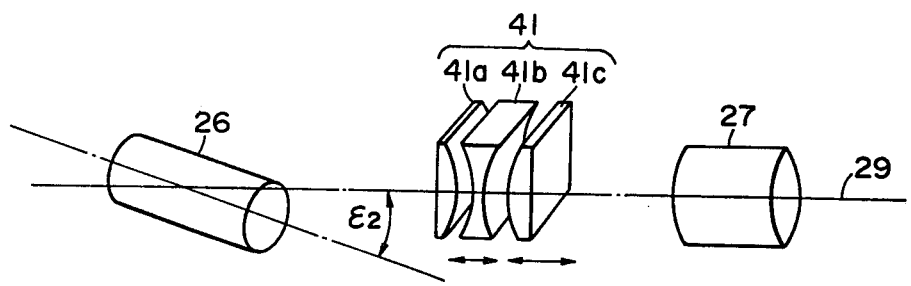
FIG. 13 shows an embodiment of the cylindrical anamorphic optical system applied to the present invention.

As a means for solving (A) above, as shown, for example, in FIG. 13, a cylindrical system 41 having a common optic axis 29 and having a power in the direction orthogonal to the swing and tilting cross-section is disposed between the swing and tilting lens 26 and the master lens 27. This cylindrical system may comprise minimum two element systems, and by mutually moving suitable two elements of this cylindrical system correspondingly to θ, it is possible to provide a lateral magnification cos θ in the power direction and to coincide the image forming position in the power direction of the cylindrical system with the image forming position in the flat direction, namely, in the swing and tilting cross-section. It is evident that the then magnification in the flat direction is +1, and it should further be noted that the image forming position in this direction is determined solely by the refractive index and the entire thickness of the glass or plastic material used. As regards the amounts of movement of the two elements, mathematical means for determining the amount of movement of the path system (see equation (62)) is intactly applicable to the power arrangement in the power direction and need not be described any further. For example, in a cylindrical system comprising two elements, ν=1 and μ=2.

The method of synchronous operation with θ involved to realize these movements does not essentially differ from the method of movement for the variable path system and is easy.

The aforementioned cylindrical system may alternatively be inserted, for example, between the variable path system 25 and the swing and the swing and tilting lens 26 or may be inserted even between the rotatable mirror 22 and the variable path system. In the latter case, the mathematical means will only become a little more complex and it is apparent that the intended purpose can essentially be achieved. As a further alternative, the cylindrical system may be disposed anywhere between the rotatable mirror 2 and the photosensitive medium surface. In carrying out the present invention, a most suitable position may be selected.

An embodiment of the cylindrical system when the swing and tilting cross-section magnification is constant will be shown below.

The cylindrical system 41 comprises three groups, namely, a first group which is a stationary cylindrical system 41a, a second group which is a concave cylindrical system 41b having an amount of movement ν, and a third group which is a convex cylindrical system 41c having an amount of movement μ. In the present embodiment, the cylindrical system 41 is disposed rearwardly of the variable path system 25 and the swing and tilting lens system 26 of the previous embodiment. The first, second and third groups are a variable path system, the fourth group is a swing and tilting lens system, the fifth group is a stationary cylindrical system, and the sixth and seventh groups are a movable cylindrical system.

|  | 1/f | e |
|---|---|---|
| 1st group | 0.0067 | 80 |
| 2nd group | −0.011 | 30 |
| 3rd group | −0.006 | 30 |
| 4th group | 0.008 | 50.89228 |
| 5th group | 0.006661 | 30 |
| 6th group | −0.018215 | 30 |
| 7th group | 0.007724 | |

The amounts of movement ν and μ of the movable cylindrical systems 41b and 41c in the power arrangement as shown above are as follows.

| x | θ | ν | μ | β(Tz) |
|---|---|---|---|---|
| −250 | −32.0054 | 2.78752 | −13.92942 | 1. |
| −200 | −26.5651 | 1.92714 | −9.26609 | 1. |
| −150 | −20.5561 | 1.15795 | −5.38310 | 1. |
| −100 | −14.0363 | 0.54165 | −2.45214 | 1. |
| −50 | −7.1250 | 0.14014 | −0.62369 | 1. |
| 0 | 0 | 0 | 0 | 1. |
| 50 | 7.1250 | 0.14014 | −0.62369 | 1. |
| 100 | 14.0363 | 0.54165 | −2.45214 | 1. |
| 150 | 20.5561 | 1.15795 | −5.38310 | 1. |
| 200 | 26.5651 | 1.92714 | −9.26609 | 1. |
| 250 | 32.0054 | 2.78752 | −13.92942 | 1. |

Figure 14:
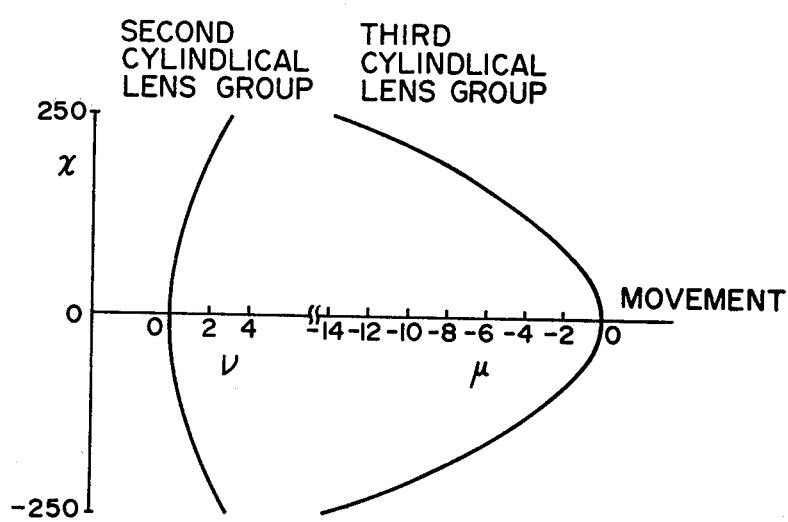
FIG. 14 shows the state of movement of the movable lens groups of the cylindrical anamorphic optical system.

The amounts of movement u and v of the movable lens groups 25b and 25c of the variable path system 25 are the amounts of movement shown in the previous embodiment. In the case of the previous embodiment, β(Tz) is reduced by cos θ by swing and tilting as previously described. Therefore, in the cylindrical system 41 of the present embodiment, the magnification βz of the cylindrical system is expanded by 1/cos θ by the cylindrical systems 41b and 41c, and the magnification β(Tz) in the entire z-direction becomes 1x. Also, the magnification β(Ty) in the y-direction is maintained at 1x because no power is in the cylindrical system. FIG. 14 illustrates the movement relation between the amount of movement ν of the second cylindrical system of the above-described embodiment and the amount of movement μ of the third cylindrical system.

As a means for solving (B), just the same method as (A) would occur to mind. That is, use may be made of a construction which comprises minimum two elements having a power in the swing and tilting cross-section, and a cylindrical system having two mutually movable elements may be disposed at a suitable location between the rotatable mirror 22 and the photosensitive medium surface.

The principle of concept is just the same as that for (A) above and in this case, it may be applied in the swing and tilting cross-section. In that case, design should be made such that the lateral magnification in this cross-section is varied at 1/cos θ for θ and that the image forming position in this cross-section is coincident with the image forming position in the cross-section orthogonal to the swing and tilting cross-section.

Figure 15:
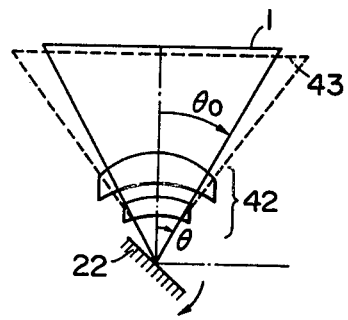
FIG. 15 shows another embodiment of the cylindrical anamorphic optical system applied to the present invention.

As the means for solving (B), there is a method which comprises disposing, between the original image surface 1 and the rotatable mirror 22, a cylindrical system 42 having its optic axis in the direction of θ=0 and having a power in the swing and tilting cross-section, namely, in the scanning direction, as shown in FIG. 15. This cylindrical system 42 is designed with a strain characteristic such that the conjugate image position 43 of the original image surface 1 by this system lies at a point which approaches about $$\sum_{i=1}^{k} d'i(1 - \frac{1}{n'i})$$

from the original image surface 1 toward the rotatable mirror 22 along the optix axis, where m'i is the refractive index of the ith glass or plastic material forming this system, d'i is the center thickness thereof and (K is the number of the glasses or the plastic materials used) and that the local magnification of this conjugate image plane for the scanning deflection angle θ by the rotatable mirror in the scanning direction is 1/cos θ. This strain characteristic will now be described.

Figure 16:
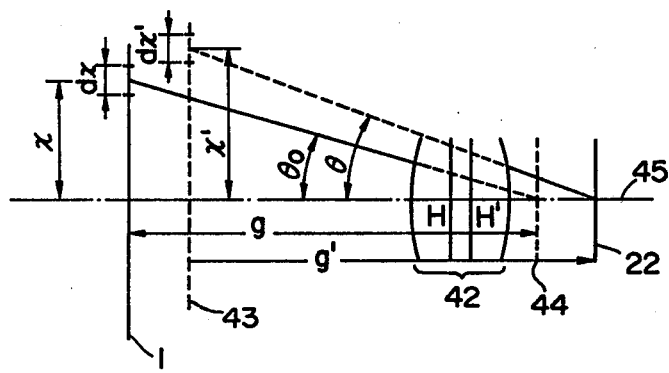
FIG. 16 illustrates the strain characteristic of the lens system shown in FIG. 15.

FIG. 16 is an illustration for this and shows the cross-section in the scanning direction, namely, the cross-section in the power direction of the cylindrical system 42. Let g be the distance from the conjugate position on the object side for the position of the rotatable deflecting mirror 22, i.e. in the space in which the original image surface 1 exists, namely, the entrance pupil position 44 to the original image surface 1 (this (this corresponds to the apparent position of the rotatable mirror as viewed from the original image surface side), g' be the distance from the rotatable mirror 22 to the conjugate image plane 43 of the original image surface 1 ($=-L'_o$: $L'_o$ is the central arm length of the rotatable scanning mirror 22), x be the scanned position of the original image surface 1 from the optic axis 45, $\theta_o$ be the angle subtending said position from the entrance pupil 44, x' be the conjugate image height position of the conjugate image plane relative to x, and θ be the angle subtending said position x' from the rotatable mirror 22 (namely, the scanning deflection angle).

Then, there is established:

$$dx'/dx = 1/\cos \theta \qquad (100)$$

where $$\begin{cases} x = -g\tan\theta \\ x' = -g'\tan\theta \end{cases} \qquad (101)$$

Further, the following is generally established from the image forming relation:

$$g = (\beta\beta_p)^{-1} g' \quad \begin{cases} \beta: \text{ paraxial lateral magnification in the power direction of the object (original image surface)} \\ \beta_p: \text{ paraxial lateral magnification in the power direction of the pupil} \end{cases} \qquad (102)$$

With equation (101) taken into consideration, equation (100) may be transformed into $$d\tan\theta_o = \frac{g'}{g} \times \frac{d\tan\theta}{\sqrt{1 + \tan^2\theta}} \qquad (103)$$

By integrating equation (103) with the fact that when θ=0, $\theta_o$=0 into account, there is obtained the following:

$$\tan\theta_o = (g'/g)\log e | \tan\theta + \sqrt{1+\tan^2\theta} | \qquad (104)$$

Therefore, if the strain characteristic of this system in the scanning direction is defined by $$\text{Dist}(\%) = x' - x/x \times 100 \qquad (105),$$

equation (105) becomes as follows from equation (101):

$$\text{Dist}(\%) = \left( \frac{\tan\theta}{\log e | \tan\theta + \sqrt{1+\tan^2\theta} |} - 1 \right) \times 100 \qquad (106)$$

For example, when $\theta = 30°$, Dist is 5.11%. It is sufficiently possible in the ordinary designing work to realize such a degree of strain characteristic.

Incidentally, in the foregoing embodiment, the scanning position x on the original image surface 1 and the deflection angle $\theta$ by the rotatable mirror 12 somewhat differ from each other from equation (12). That is, from equation (101), $\theta_o$ is given by $$\theta_o = \tan^{-1}(-x/g) \quad (107)$$

and from this $\theta_o$ and from equation (104), $\theta$ is given by
$$\tan\theta = \tfrac{1}{2}\{e^r - e^{-r}\}\Gamma = \tan\theta_o/\beta\beta_p \quad (108)$$

The $\theta$ and x' (see equation (101)) so given are combined with the behaviors of the variable path system and subsequent systems without modification. At this time, the apparent central arm length of the rotatable mirror (which corresponds to $L_o$ in equation (12)) will be given by $L'_o = g'$. When x is scanned and moved at a uniform velocity, the relation of equations (107) and (108) is applied. At that time, the exposure slit width is automatically determined without contradiction by a real field aperture 23 disposed just before the photosensitive medium surface (see FIG. 4).

The cylindrical system 42 may also include a partly rotation-symmetrical optical system to improve the image formation performance. In this case, the amount of shift $$\sum_{i=1}^{k} d'_i \left(1 - \frac{1}{n'_i}\right)$$

of the conjugate image plane position of the original image surface 1 is not restricted thereto but essentially, design is made such that the conjugate image positions and lateral magnifications in the scanning direction cross-section and in the cross-section orthogonal thereto are coincident with each other. Such design is useually readily possible.

About the optical system for removing the difference of $\cos\theta$ in picture-taking magnification of the swing and tilting object and the swing and tilting lens between two directions, description has hitherto been made with respect to the case of A) where $\beta_{Ty} = \beta_T$ and the case of B) where $\beta_{Tz} = \beta_T$, respectively. Further, in usual cases, solution could be reached by mingling the means of solution for (A) with the means of solution for (B).

Alternatively, an optical system including a toroidal plane may be used.

Which means should be adopted will be determined by the specification of the apparatus.

Description will now be made of the mechanism for high speed which is an object of the present invention. An embodiment of the mechanism for moving the mirror and lenses is shown in FIG. 17.

As already described, the movement of the mirror and lenses is rotation or reciprocal parallel movement for each copying cycle. Generally, reciprocal movement is liable to give a greater shock or the like as the speed thereof is higher.

In the present embodiment, discontinuous movement is avoided and smooth high-speed copying is realized.

Figure 17:
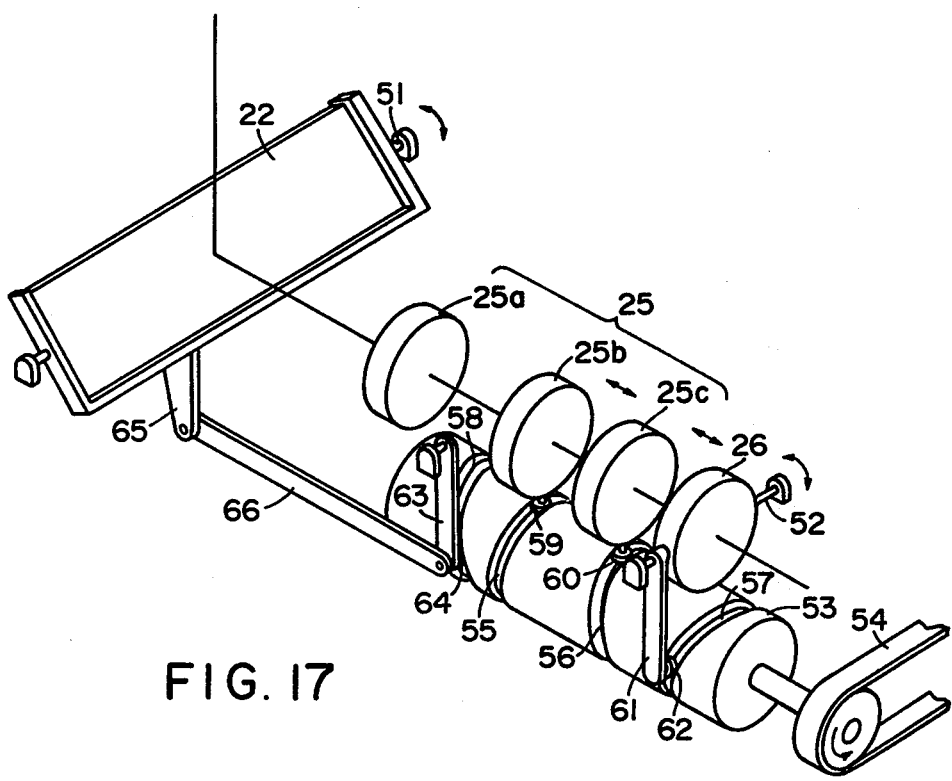
FIGS. 17 and 18 illustrate the mechanisms of the variable path system and the swing and tilting lens system.

As shown in FIG. 17, the rotatable mirror 22 is swingably supported on a shaft 51. The stationary lens group (the first group) 25a of the variable path system 25 is secured to the main body. The movable lens group (the second group) 25b and the movable lens group (the third group) 25c are respectively supported for parallel movement to the optic axis thereof by unshown means. The swing and tilting lens 26 is swingablly supported on a shaft 52.

Provided just beneath these lenses and parallel to the optic axis is a cylindrical cam 53 which is normally rotated in one direction in synchronism with the photosensitive medium by a belt 54 or like means. The cylindrical cam 53 is provided with four cam grooves 55, 56, 57 and 58. Fitted in the cam groove 55 is a cam follower 59 extending from the second group 25b. Fitted in the cam groove 56 is a cam follower 60 extending from the third group 25c. Fitted in the cam groove 57 is a cam follower 62 forming an end of an arm 61 extending from the swing and tilting lens 26. Fitted in the cam groove 58 is a cam follower 64 forming an end of an arm 63 swingably supported. The end of the arm 63 and an arm 65 extending from the rotatable mirror 22 are coupled toether by a link 66.

Figure 18:
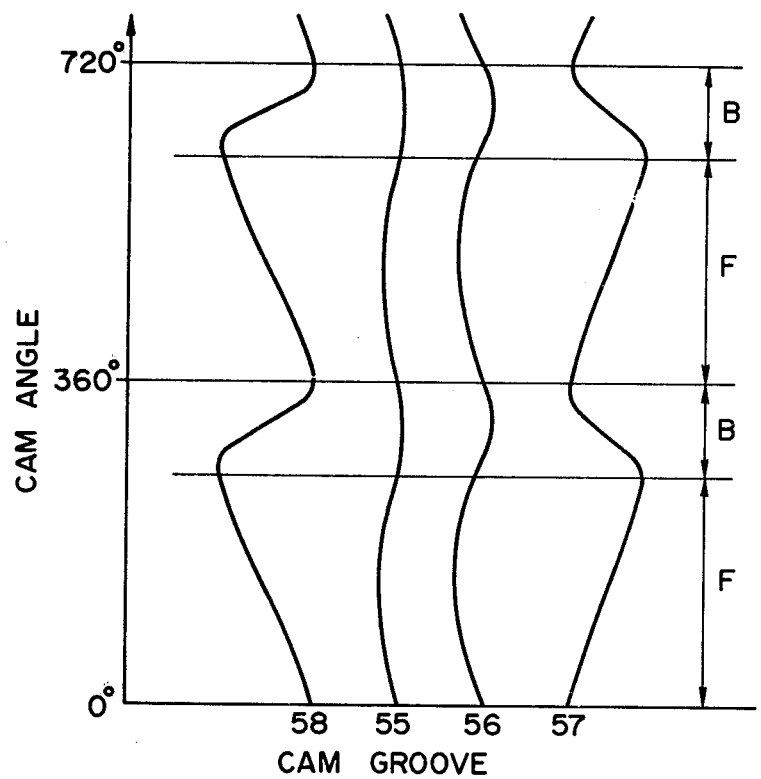

Now, if the cylindrical cam 53 is rotated, the second 25b and the third group 25c are moved parallel to the optic axis in accordance with the shape of their respective cam grooves and the swing and tilting lens 26 swings about the shaft 52. The rotatable mirror 22 also swings about the shaft 51. The shapes of the cam grooves 55, 56, 57 and 58 are set so that the relation between the amounts of movement and the amounts of rotation at this time satisfies the aforementioned image forming coditions. The shapes (developed) of the cam grooves of the cylindrical cam 53 are shown in FIG. 18. One full rotation of the cylindrical cam 53 corresponds to one copying cycle, and in FIG. 18, the region F shows exposure time and the region B shows the return time of the optical system (only the rotatable mirror 22 and the swing and tilting lens 26).

In the present embodiment, the copying efficiency is enhanced by shortening the return time B in a range which is not inconvenient to the movement (the so-called quick return). Also, the cam groove shape in the connecting portion wherein the shif from the exposure F to the return B or the shift from the return B to the exposure F occurs is smoothed. This, coupled with the one-way continuous rotation of the drive source, ensures smooth movement to be accomplished to enable sufficiently high-speed copying.

Actually, in the above-described mechanical system, the principal points $H_2$ and $H_2'$ are spaced apart from each other during the rotation of the swing and tilting lens 26, as shown in FIG. 6. That is, in case where $H_3H_3' \neq 0$, there occurs a phenomenon that the object side optic axis and the image side optic axis with respect to the swing and tilting lens effect parallel shift with rotation. In order to avoid this, it is desirable to substantially satisfy the condition of $\overrightarrow{HH'} = \vec{0}$ in designing.

In the foregoing, description has been made of the high-speed copying system of the optical system of the present invention whereby a flat original image surface is slit-exposed and scanned by the rotatable mirror and the image is projected at a predetermined position on the photosensitive medium surface, without swing and tilting, upon the basis of the synchronizing operation of the variable path system and the swing and tilting lens. As regards the scanning speed of the original image surface, and for example, where the photosensitive medium surface is the surface of a rotatable drum rotated at a uniform angular velocity, it is more desirable that the image scanning speed on the original image surface be a synchronized uniform velocity corresponding to the copying magnification, since the peripheral velocity of the surface of such drum is constant. Accordingly, in order to enable uniform velocity scanning on the original image surface, the above-described operating mechanism may be non-linear-cam-rotated correspondingly, for example, to the rotational angular velocity of the rotatable mirror, as already described in connection with the embodiment of the mechanical system.

The present invention is a system which enables high-speed copying and therefore, the photosensitive medium suited for the high-speed copying should preferably be one basically comprising three layers, namely, an electrically conductive substrate, a photoconductive layer and an insulating layer.

A latent image may be formed on the photosensitive medium, for example, by primary charging and subsequent discharging or charging with the opposite polarity to the primary charging, and thereafter whole surface exposure.

Of course, it is obvious that the present invention may be carried out not only at high speed but also at a conventional copying speed and the photosensitive medium may be other than the aforementioned one.

Lastly, description will be made of the illumination of the original image surface 1 for uniforming the illumination on the effective projection surface of the photosensitive medium in the optical system of the present invention which enables high-speed copying.

Figure 19:
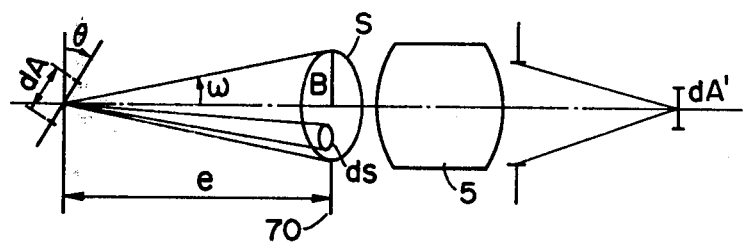
FIG. 19 illustrates the relation of the illumination in the swing and tilting lens system.

FIG. 19 illustrates the relation between the object and the image after the rotatable mirror in the swing and tilting cross-section. That is, the object of the projection optical system 5 (which is a synthetic optical system comprising a variable path system, a swing and tilting lens system, a master lens, etc.) inclined by the scanning deflection angle $\theta$, and this is imaged on the image plane, namely, on the photosensitive medium surface without swing and tilting. In FIG. 19, dA is the length of a small object in the shown cross-section (which substantially corresponds to the slit width $l_1$), and dA' is the length of a small image (which substantially corresponds to the slit width $l'$). The distance of the entrance pupil position 70 of the projection optical system 5 from the object position is e, the half-angle of the object side opening is $\omega$, the radius of the entrance pupil is R, and the area of the entrance pupil is $S(\cong \pi R^2)$.

Then, from Lambertian law, the light flux $d\phi$ emanating from the small object and leading to a minute area dS on the entrance pupil plane is given by $$d\phi = (Bd A \cos \theta \cdot dS)/e^2 \qquad (109)$$

where B is the brightness of the object surface. The light flux $d\phi'$ reaching dA'; is given by $$d\phi' = rd\phi \qquad (110)$$

where r is the energy transmittivity loss rate of the projection optical system.

Thus, the illumination dE of the image at the small line length dA' is $$dE = d\phi'/dA' = (rB \cos \theta dS/e^2)(dA/dA') \qquad (111)$$

Assuming that the density of the light flux is uniform for the total entrance pupil plane S (this substantially corresponds to the actual one), the total illumination E is $$E = \int_S dE = \frac{rBS\cos\theta}{e^2}\left(\frac{dA}{dA'}\right) \qquad (112)$$

By applying $S = \pi R^2$ to S and taking the following into consideration $$R/e \cong \sin V = 1/2F_o \quad (F_o: \text{effective F-number of the object side}) \qquad (113)$$

there is obtained the following:

$$E(\theta) = \pi rB \cos \theta/4F_o(dA/dA') \qquad (114)$$

If the lateral magnification of the projection optical system is $\beta'_T(=dA'/dA)$ (this corresponds to the copying magnification) and the image side F-number of this optical system is F, from $$\beta'_T = F/F_o \qquad (115)$$

from the sine condition, the following is finally obtained:

$$E(\theta) = (\pi rB \cos \theta/4F^2) \times \beta'_T \qquad (116)$$

This result is an ideal case and from this, the illumination in the swing and tilting cross-section is substantially proportional to the cosine of the scanning deflection angle.

Also, it is apparent that in the cross-section orthogonal to the swing and tilting cross-section, said illumination is proportional to the well-known $\cos^4 \omega_o$ ($\omega_o$: the object side half angle of view in the slit direction).

Figure 20:
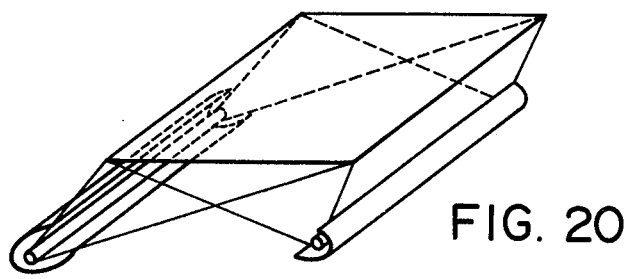
FIG. 20 shows an embodiment of the illuminating device applied to the apparatus according to the present invention.

Thus, as the illuminating device for the original image surface 1, the whole surface illumination as shown, for example, in FIG. 20, would occur to mind. For example, a halogen lamp tube with an illumination reflector which is parallel to the direction of the depth orthogonal to the scanning direction is disposed on either side of the original image surface in the scanning direction so that, as the result, the illumination in the opposite directions from the center position of the scanning is increased by about $1/\cos \theta$ times above the illumination at the center of the scanning, correspondingly to the scanning deflection angle $\theta$. However, in a method wherein an anamorphic system is usually disposed between the original image surface 1 and the rotatable mirror, $\theta \rightarrow \theta_o$ (FIG. 15) is adopted. Also, as regards the direction of the depth orthogonal to the scanning, it is generally well-known, for example, to disposed the light source within the halogen lamp so that it is raised by $1/\cos^4 \omega$ from the center or to widen the slit width in accordance with the perimeter.

The present invention is applicable to both of direct copying and transfer copying.

What we claim is:

1. A copying apparatus having a high-speed copying optical system, comprising:
    fixed supporting means for supporting thereon an original to be copied;
    rotatable deflecting means for scanning said original;
    a photosensitive medium for receiving a light flux deflected by said rotatable deflecting means; and
    an image forming optical system disposed between said rotatable deflecting means and said photosensitive medium for imaging the light flux from said original on said photosensitive medium, said system having a first optical element having means for correcting the state of the surface of said original being inclined with respect to the optic axis of said image forming optical system as the result of operation of said rotatable deflecting means, and a second optical element having means for correcting, while maintaining a predetermined image forming magnification, the variation in length of the light path between said original surface and said photosensitive medium resulting from the operation of said rotatable deflecting means.

2. A copying apparatus having a high-speed copying optical system, comprising:
fixed supporting means for supporting thereon an original to be copied;
rotatable deflecting means for scanning said original;
a photosensitive medium for receiving a light flux deflected by said rotatable deflecting means; and
an image forming optical system disposed between said rotatable deflecting means and said photosensitive medium for imaging the light flux from said original on said photosensitive medium, said optical system having optical means for always maintaining constant the angle formed by the surface of said original with the surface of said photosensitive medium which is varied with the operation of said rotatable deflecting means, and optical means for always maintaining said photosensitive medium surface and said original surface optically conjugate while maintaining the image forming lateral magnification constant.

3. The copying apparatus according to claim 2, wherein said image forming optical system has optical means for equalizing the lateral magnification of the image of said original surface on said photosensitive medium surface in orthogonal directions.

4. The copying apparatus according to claim 2, wherein optical means for equalizing the lateral magnification of the image of said original surface on said photosensitive medium surface in orthogonal directions is provided between said supporting means and said rotatable deflecting means.

5. The copying apparatus according to claim 2, 3 or 4, wherein said image forming optical system has optical means for varying the lateral magnification of the image of the original surface on said photosensitive medium surface.

6. A copying apparatus having a high-speed copying optical system, comprising:
a fixed flat original carriage for supporting thereon an original to be copied;
a rotatable deflector having a reflecting surface for scanning the surface of said original;
a photosensitive surface for receiving a light flux deflected by said rotatable deflector;
an image forming optical system disposed between said deflector and said photosensitive surface and having means for maintaining constant the lateral magnification at which said original surface is imaged on said photosensitive surface, and means for always maintaining said original surface and said photosensitive surface at optically conjugate positions; and
a swing and tilting optical system disposed between said deflector and said photosensitive surface and having the inclination of the optic axis thereof variable with respect to the optic axis of said image forming optical system in synchronism with the operation of said deflector.

7. The copying apparatus according to claim 6, wherein said image forming optical system has at least two optical elements movable in synchronism with the operation of said deflector.

8. A copying apparatus having a high-speed copying optical system, comprising:
a fixed flat original carriage for supporting thereon an original to be copied;
a rotatable deflector having a reflecting surface for scanning the surface of said original;
a photosensitive surface for receiving a flux deflected by said rotatable deflector;
an image forming optical system disposed between said deflector and said photosensitive surface and having means for maintaining constant the lateral magnification at which said original surface is imaged on said photosensitive surface, and means for always maintaining said original surface and said photosensitive surface at optically conjugate positions;
a swing and tilting optical system disposed between said deflector and said photosensitive surface and having the inclination of the optic axis thereof variable with respect to the optic axis of said image forming optical system in synchronism with the operation of said deflector; and
an anamorphic optical system disposed between said original surface and said photosensitive surface for equalizing the lateral magnification of the image of the original surface on said photosensitive surface in orthogonal directions.

9. The copying apparatus according to claim 8, wherein said anamorphic optical system comprises a plurality of cylindrical optical elements disposed between said deflector and said photosensitive surface and at least two of said optical elements are movable in synchronism with the operation of said deflector.

10. The copying apparatus according to claim 8, wherein said anamorphic optical system is a fixed cylindrical optical system disposed between said original carriage and said deflector.

11. A copying apparatus having a high-speed copying optical system, comprising:
a fixed flat original carriage for supporting thereon an original to be copied;
a rotatable deflector having a reflecting surface for scanning the surface of said original;
a photosensitive surface for receiving a light flux deflected by said rotatable deflector;
an image forming optical system disposed between said deflector and said photosensitive surface and having means for maintaining constant the lateral magnification at which said original surface is imaged on said photosensitive surface, and means for always maintaining said original surface and said photosensitive surface at optically conjugate positions;
a swing and tilting optical system disposed between said deflector and said photosensitive surface and having the inclination of the optic axis thereof variable with respect to the optic axis of said image forming optical system in synchronism with the operation of said deflector; and
an image forming magnification control optical system disposed between said deflector and said photosensitive surface for controlling the lateral magnification of the image of the original surface on said photosensitive surface.

12. A copying apparatus having a high-speed copying optical system, comprising:
- a fixed flat original carriage for supporting thereon an original to be copied;
- a rotatable deflector having a reflecting surface for scanning the surface of said original;
- a photosensitive surface for receiving a light flux deflected by said rotatable deflector;
- an image forming optical system disposed between said deflector and said photosensitive surface and having means for maintaining constant the lateral magnification at which said original surface is imaged on said photosensitive surface, and means for always maintaining said original surface and said photosensitive surface at optically conjugate positions;
- a swing and tilting optical system disposed between said deflector and said photosensitive surface and having the inclination of the optic axis thereof variable with respect to the optic axis of said image forming optical system in synchronism with the operation of said deflector;
- an anamorphic optical system disposed between said original surface and said photosensitive surface and having means for equalizing the lateral magnification of the image of the original surface on said photosensitive surface in orthogonal directions; and
- an image forming magnification control optical system disposed between said deflector and said photosensitive surface for controlling the lateral magnification of the image of the original surface on said photosensitive surface.

* * * * *

UNITED STATES PATENT AND TRADEMARK OFFICE
CERTIFICATE OF CORRECTION

PATENT NO. : 4,213,690

DATED : July 22, 1980

INVENTOR(S) : MUNEHARU SUGIURA, ET AL.

Page 1 of 2

It is certified that error appears in the above—identified patent and that said Letters Patent is hereby corrected as shown below:

Column 2, line 23, "invetion" should be -- invention --.

Column 4, line 22, "nagative" should be -- negative --.

Column 5, line 45, "rotatin" should be -- rotation --.

Column 7, line 43, "filting" should be -- tilting --.

Column 7, line 44, "nomal" should be -- normal --.

Column 10, line 14, "cross-" should be -- cross-section --.

Column 11, line 30, "movalbe" should be -- movable --.

Column 11, line 53, "...,k-)" should be -- ...,k-1 --.

Column 12, line 48, "($\geq 0$" should be -- ($\geq \ell$) --.

Column 12 and 13, in each of equations 43, 45, 46, 50, 54, 55, 57 and 58, "$\phi$" each occurrence, should be -- $\psi$ --.

Column 14, line 45, after "G(v;$\theta$)", -- H(v;$\theta$) -- should be inserted.

Column 15, line 28, "vrious" should be -- various --.

Column 16, line 33, "$\phi$" should read -- $\psi$ --.

Column 16, line 49, "sttionary" should read -- stationary --.

UNITED STATES PATENT AND TRADEMARK OFFICE
CERTIFICATE OF CORRECTION

PATENT NO. : 4,213,690
DATED : July 22, 1980
INVENTOR(S) : MUNEHARU SUGIURA, ET AL.

It is certified that error appears in the above—identified patent and that said Letters Patent is hereby corrected as shown below:

Columns 16 and 17, Tables 1 and 2, "$\phi$" should read --$\psi$--;

Table 1, under "v(mm)", ".7009" should read --.7099--;

Table 2, under "Umm", "0.248" should read -- 0.284 --.

Column 17, line 30, "magnifications $\Phi$Ty" should read --magnification $\beta_{Ty}$--.

Column 17, line 35, "βTy" should read --$\beta_{Ty}$--.

Column 18, line 32, "and the swing" first occurrence should be deleted.

Signed and Sealed this

Tenth Day of February 1981

[SEAL]

Attest:

RENE D. TEGTMEYER

Attesting Officer       Acting Commissioner of Patents and Trademarks